United States Patent [19]

Henk et al.

[11] Patent Number: 4,540,776
[45] Date of Patent: Sep. 10, 1985

[54] REACTIVE FLUOROTRIAZINYLAMINONAPHTHO-TRIAZOLYPHENYLAZOPYRIDONE OR PYRIMIDONE DYESTUFFS

[75] Inventors: Hermann Henk, Cologne; Erich Krämer, Bergisch-Gladbach; Karl H. Schundehütte; Horst Nickel, both of Leverkusen, all of Fed. Rep. of Germany

[73] Assignee: Bayer Aktiengesellschaft, Leverkusen, Fed. Rep. of Germany

[21] Appl. No.: 608,587

[22] Filed: May 9, 1984

Related U.S. Application Data

[63] Continuation of Ser. No. 108,311, Dec. 31, 1979, abandoned.

[30] Foreign Application Priority Data

Jan. 16, 1979 [DE] Fed. Rep. of Germany ....... 2901547

[51] Int. Cl.³ .................. C09B 62/085; C09B 62/095; C09B 62/08; D06P 1/382
[52] U.S. Cl. .................. 534/635; 534/599; 534/624; 534/628; 534/634; 534/636; 534/860
[58] Field of Search .............. 260/146 T, 153; 534/635

[56] References Cited

U.S. PATENT DOCUMENTS

| 3,320,231 | 5/1967 | Ammann et al. | 260/153 |
| 3,501,454 | 3/1970 | Nickel et al. | 260/153 X |
| 3,627,749 | 12/1971 | Ackermann et al. | 260/153 |
| 4,033,994 | 7/1977 | Begrich | 260/153 |
| 4,066,389 | 1/1978 | Riat et al. | 260/153 X |

FOREIGN PATENT DOCUMENTS

| 646359 | 8/1962 | Canada | 260/154 |
| 2809200 | 9/1963 | Fed. Rep. of Germany | 260/153 |
| 1153842 | 9/1963 | Fed. Rep. of Germany | 260/153 |
| 2927102 | 1/1980 | Fed. Rep. of Germany | 260/153 |
| 2173255 | 10/1973 | France | 260/153 |
| 859198 | 1/1961 | United Kingdom | 260/153 |
| 1033264 | 6/1966 | United Kingdom | 260/153 |
| 1421923 | 1/1976 | United Kingdom | 260/153 |

*Primary Examiner*—Floyd D. Higel
*Attorney, Agent, or Firm*—Sprung Horn Kramer & Woods

[57] ABSTRACT

A metal free azo dyestuff of the formula

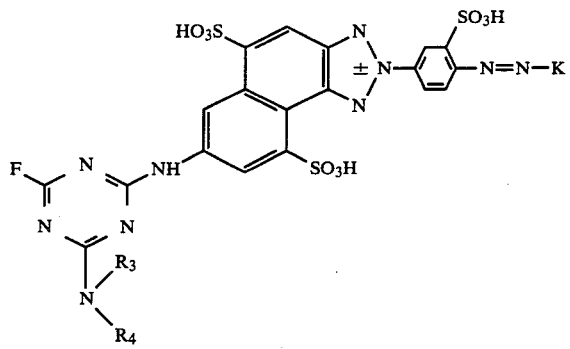

in which
K is the radical of a coupling component of pyridone, and
$R_3$ and $R_4$ each independently is hydrogen; $C_1-C_6$-alkyl; $C_1-C_6$-alkyl substituted by OH, $SO_3H$, COOH or $OSO_3H$; phenyl; naphthyl; or phenyl or naphthyl substituted by $SO_3H$ or COOH.

2 Claims, No Drawings

REACTIVE FLUOROTRIAZINYLAMINONAPHTHO-TRIAZOLYPHENYLAZOPYRIDONE OR PYRIMIDONE DYESTUFFS

This is a continuation of application Ser. No. 108,311, filed Dec. 31, 1979, now abandoned.

The present invention relates to reactive dyestuffs which optionally contain metals and, in the form of the free acid, correspond to the general formula (I)

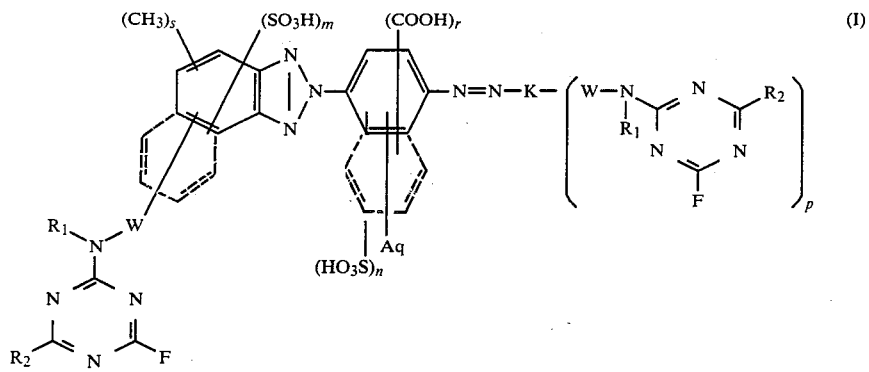

wherein
K = the radical of a coupling component, preferably of a coupling component of the benzene, naphthalene, pyrazolone, pyridone, pyrimidone, indole, aminopyrazole, aminopyridine, aminopyrimidine or acetoacetic arylide series,
A = a non-ionic substituent,
W = direct bonds or a bridge member to a C atom of the benzene or naphthalene nucleus or to a C atom of an aromatic-carbocyclic or aromatic-heterocyclic ring of the coupling component K,
$R_1$ = hydrogen or a substituent, in particular $C_1$–$C_4$-alkyl,
$R_2$ = a substituent,
m = 0, 1 or 2,
n = 0, 1 or 2,
p = 0 or 1,
q = 0, 1 or 2,
r = 0 or 1 and
s = 0 or 1,
and processes for their preparation and their use for dyeing and printing fibre materials containing OH groups or NH groups, such as cellulose, wool and synthetic polyamides.

Examples of suitable substituents $R_2$ are amino groups

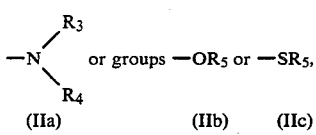

wherein
$R_3$ and $R_4$ independently of one another denote hydrogen, low-molecular alkyl, aryl, aralkyl or cycloalkyl, or together form a ring, in particular a 5-membered or 6-membered ring, optionally with the inclusion of one or more hetero-atoms, and $R_5$ represents low-molecular alkyl, aryl or aralkyl.

The alkyl, aralkyl and cycloalkyl can contain customary substituents.

Aryl preferably represents optionally substituted phenyl or naphthyl.

W preferably represents a direct bond to a C atom of an aromatic-carbocyclic or aromatic-heterocyclic ring. Examples of suitable bridge members W are —CO—, —$SO_2$—,

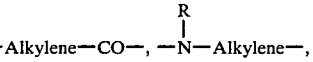

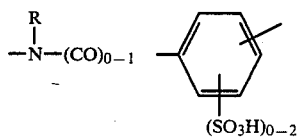

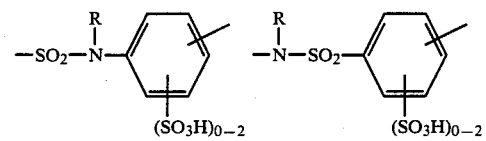

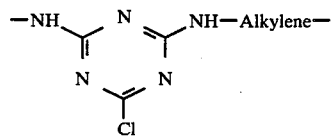

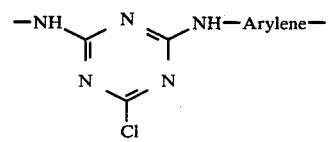

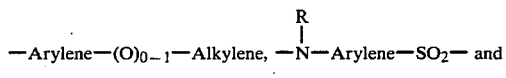

wherein
R preferably = H or $C_1$–$C_4$-alkyl,
alkylene preferably denotes $C_2$–$C_5$-alkylene and
arylene preferably denotes optionally substituted phenyl.

Preferred dyestuffs are those of the formula (III)

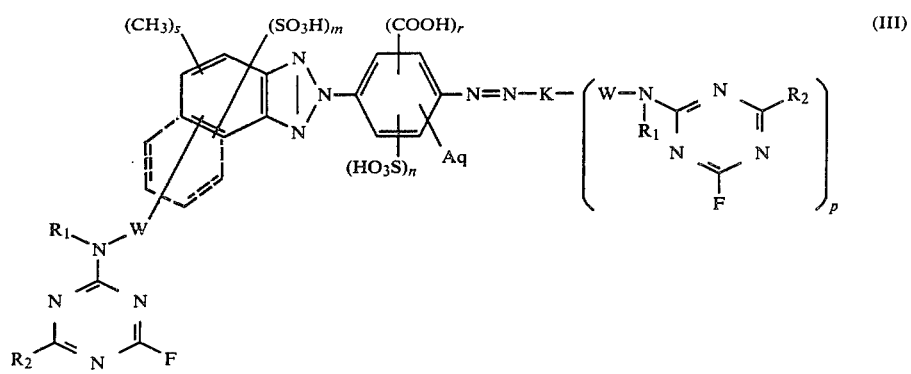

in which m, n, r, p, q, s, A, K, R₁, R₂ and W have the meaning indicated in formula (I),
and furthermore those of the formula (IV)

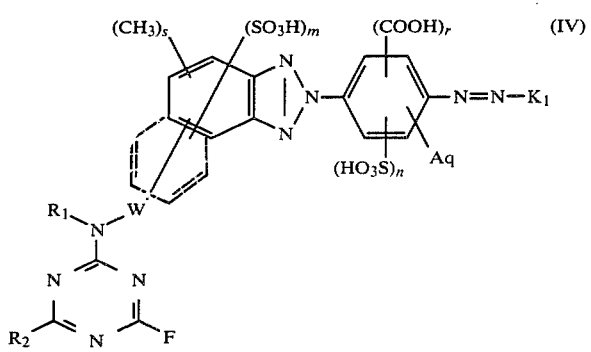

in which
m, n, r, q, s, A, R₁, R₂ and W have the meaning indicated in formula I and
K₁ represents a coupling component of the benzene, naphthalene, pyrazolone, pyridone, pyrimidone, indole, aminopyrazole, aminopyrimidine, aminopyridine or acetoacetic arylide series which contains no monofluorotriazine radical,
and furthermore those of the formula (V)

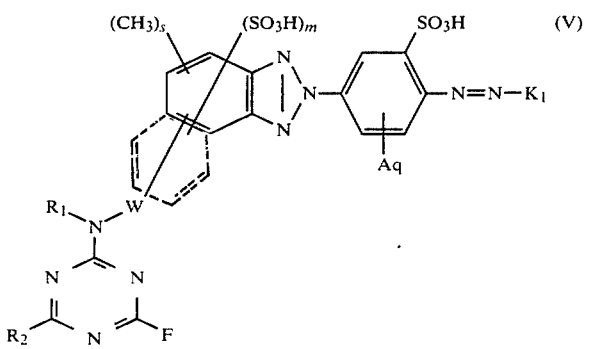

in which m, q, s, A, W, R₁, R₂ and K₁ have the meaning indicated in formula (IV),
and furthermore those of the formulae (VI) and (VIa)

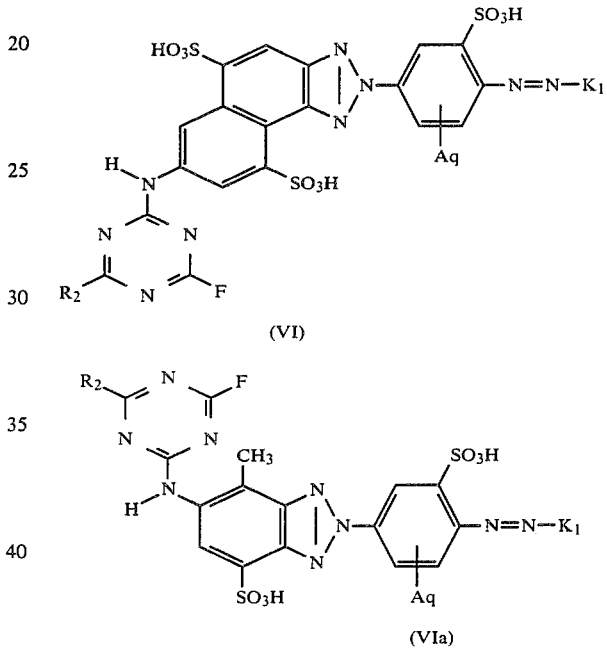

in which q, A, R₂ and K₁ have the meaning indicated in formulae (IV),
and in particular dyestuffs of the formulae (III) to (VIa) in which K and K₁ denote the radical of a coupling component of the pyrazolone, pyridone, pyrimidone, indole, aminopyrazole, aminopyridine, aminopyrimidine or acetoacetic arylide series,
and in particular dyestuffs of the formulae (III) to (VIa) in which K and K₁ denotes a radical of the formula (VII)

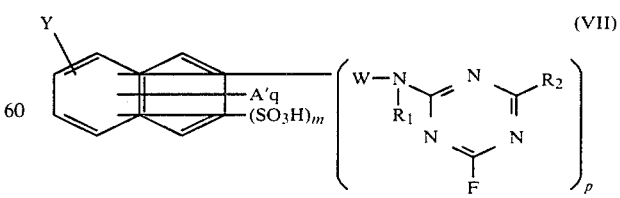

in which
p, q, m, R₁, R₂ and W have the meaning indicated above,
Y represents a hydroxyl group or amino group and A' represents a non-ionic substituent,
and in particular dyestuffs of the formulae (IV) to (VIa) in which $K_1$ represents a radical of the formula (VIII)

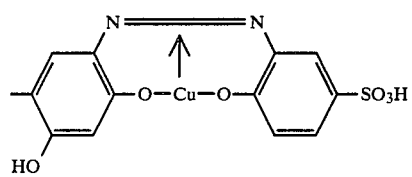
(VIII)

and furthermore those of the formula (IX)

$Y_1$ represents $C_1$–$C_4$-alkyl, carboxyl or carbalkoxy with 1–4 C atoms in the alkoxy group and $Y_2$ denotes an aromatic-carbocyclic radical, in particular one of the benzene or naphthalene series, which is optionally further substituted by non-ionic substituents, and furthermore those of the formula (X)

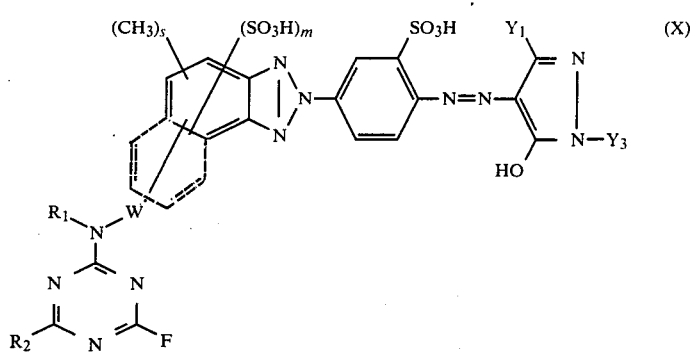

in which
m, s, $R_1$, $R_2$, W and $Y_1$ have the meaning indicated above and $Y_3$ represents hydrogen or a $C_1$–$C_4$-alkyl radical which can optionally be substituted by hydroxyl, halogen, cyano, carboxyl or carbalkoxy, and furthermore those of the formula (XI)

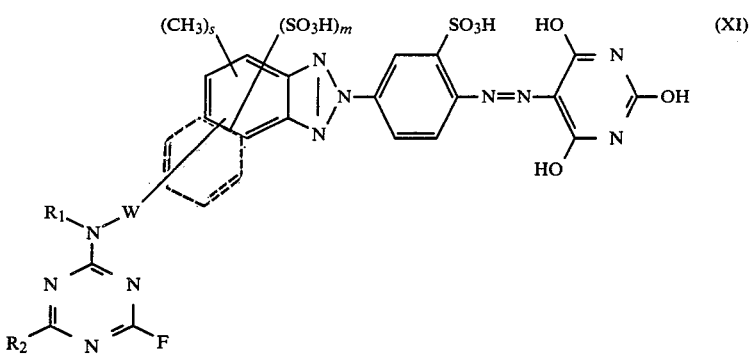

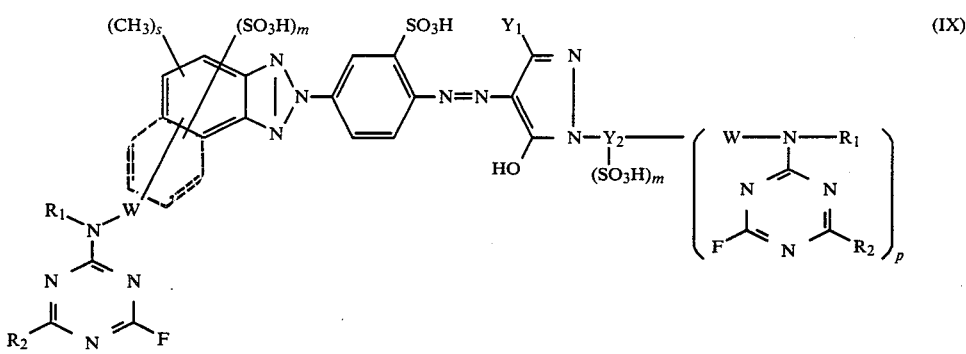

in which
m, p, s, $R_1$, $R_2$ and W have the abovementioned meaning.

in which m, s, $R_1$, $R_2$ and W have the abovementioned meaning, and furthermore those of the formula (XII)

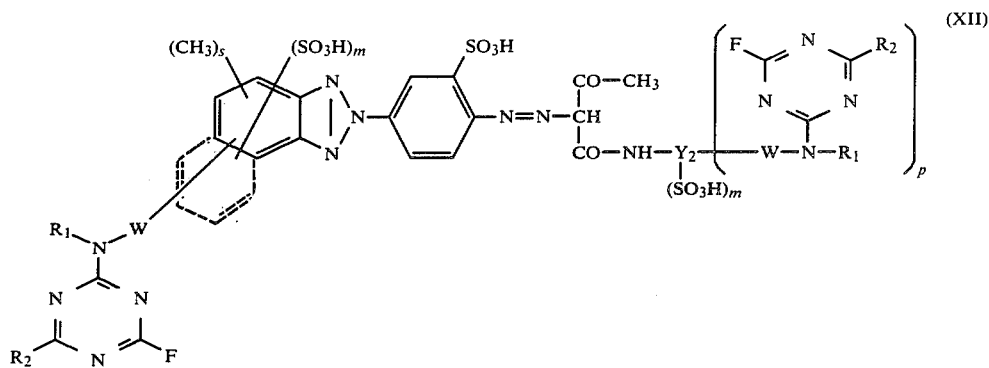

in which m, s, p, $R_1$, $R_2$, W and $Y_2$ have the meaning indicated above,
and furthermore those of the formula (XIII)

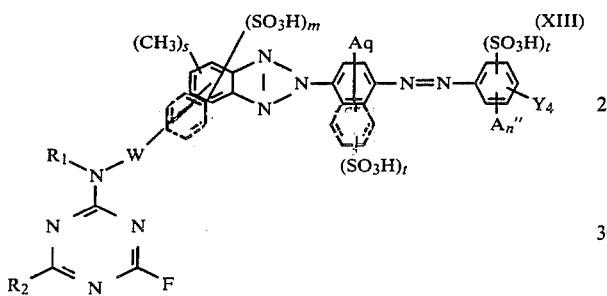

in which m, s, n, q, A, $R_1$, $R_2$ and W have the meaning indicated above, t is 0 or 1, A″ represents a non-ionic substituent and $Y_4$ represents an optionally alkylated hydroxyl group, an amino group which is optionally substituted by alkyl or acyl radicals or for the radical

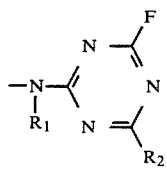

wherein $R_1$ and $R_2$ have the meaning indicated above.

Examples of suitable non-ionic radicals A are halogen atoms, such as F, Cl and Br, cyano groups, alkyl radicals with 1–4 C atoms, such as —$CH_3$, —$C_2H_5$, n- and i-$C_3H_7$ and n-, i- and t-$C_4H_9$, and alkoxy radicals with 1–3 C atoms, such as alkoxy, ethoxy and n- and i-propoxy, acylamino radicals, such as, for example, formylamino, $C_1$–$C_4$-alkylcarbonylamino, such as acetylamino or propionylamino, and OH.

Examples of suitable non-ionic radicals A′ are alkoxy radicals with 1–3 C atoms, such as methoxy, ethoxy and n- and i-propoxy, acylamino radicals, such as, for example, forylamino, $C_1$–$C_4$-alkylcarbonylamino, such as acetyl and propionylamino, arylcarbonylamino groups, in particular phenylcarbonyl-, tolylcarbonyl- or anisylcarbonyl-amino, $C_1$–$C_4$-alkylsulphonylamino groups, such as methyl, ethyl and propylsulphonylamino, arylsulphonylamino groups, such as phenyl- and tolyl-sulphonylamino, carboxyl, carboxamide and sulphonamide groups which are optionally monosubstituted or disubstituted by $C_1$–$C_4$-alkyl radicals, such as —$CH_3$, —$C_2H_5$ or n- or i-$C_3H_7$, or by aryl radicals, such as phenyl, chlorophenyl, tolyl or anisyl, $C_1$–$C_4$-alkylamino radicals, such as, for example, —NH—$CH_3$, —N($CH_3$)$_2$, —NH—$C_2H_5$, —NH—$C_3H_7$ and —N($C_4H_3$)$_2$, and arylamino radicals, in particular phenylamino radicals optionally substituted by chlorine, bromine, methyl and methoxy.

Possible non-ionic substituents A″ are, in particular: halogen atoms, such as Cl and F, alkyl and alkoxy radicals with 1–4 C atoms, cycloalkyl radicals, preferably the cyclohexyl radical, and aryl radicals optionally substituted by halogen, such as phenyl and chlorophenyl.

The radicals A—A″ can in each case be identical or different.

Examples of suitable radicals $Y_1$ are —$CH_3$, —$C_2H_5$, —COOH, —COO$CH_3$ and —COO$C_2H_5$.

$Y_2$ is preferably a phenyl radical substituted, for example, by $C_1$–$C_4$-alkyl, such as —$CH_3$, —$C_2H_5$ or n- or i-$C_3H_7$, halogen, such as Cl or Br, or by $C_1$–$C_4$-alkoxy, such as —O$CH_3$, —O$C_2H_5$ or —O$C_3H_7$.

Examples of suitable radicals $Y_3$ are hydrogen, alkyl radicals with 1–4 C atoms, such as —$CH_3$, —$C_2H_5$, n- and i-$C_3H_7$ and n-, i- and t-$C_4H_9$, alkyl radicals with 1–4 C atoms which are substituted by hydroxyl, cyano, carboxyl or carbalkoxy groups, such as, for example, 2-hydroxyethyl, 2-hydroxypropyl, carboxymethyl, carbethoxymethyl and 2-chloro-, 2-bromo- and 2-cyanoethyl and -propyl.

Suitable alkyl radicals for the hydroxyl group or amino group $Y_4$ are alkyl radicals with 1–7 C atoms optionally substituted by halogen, in particular chlorine or bromine, hydroxyl, alkoxy, in particular $C_1$–$C_4$-alkoxy, and cyano radicals.

Examples of suitable acyl radicals are alkylcarbonyl radicals, in particular $C_1$–$C_7$-alkylcarbonyl, and arylcarbonyl, in particular optionally substituted phenylcarbonyl.

The dyestuffs of the general formula (I) are obtained by a process in which compounds of the formula

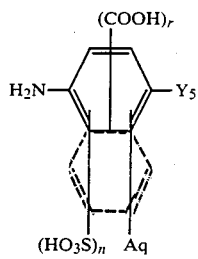 (XIV)

in which
n, r, q and A have the abovementioned meaning and
$Y_5$ denotes a nitro or acylamino group,
are diazotised and the diazotisation products are coupled with a compound of the formula

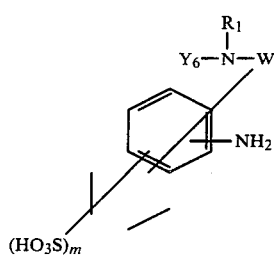 (XV)

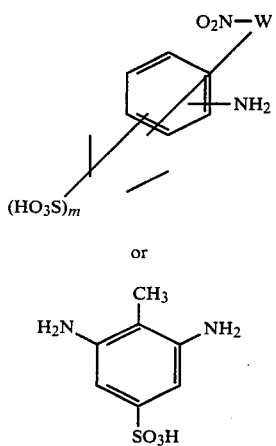

in which
m, W and $R_1$ have the abovementioned meaning and
$Y_6$ denotes hydrogen or an acyl group,
in the o-position relative to the amino group and the coupling products are then triazolated. After reduction of the nitro group or saponification of the acylamino group, which may be necessary, the products are reacted with 2,4,6-trifluoro-1,3,5-triazine

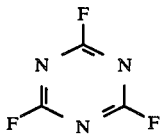 (XVI)

and a compound $R_2$-H (XVIa) P1 wherein $R_2$ has the abovementioned meaning,
in any desired sequence.

The amino compound thus obtained, of the formula (XVII)

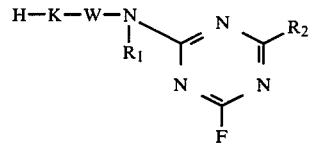 (XVII)

is diazotised and the diazotisation product is reacted with a coupling component H—$K_1$,

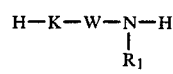 (XVIII)

or

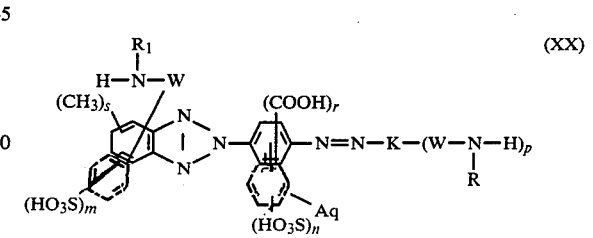 (XIX)

wherein $K_1$, K, W, $R_1$ and $R_2$ have the abovementioned meaning.

Dyestuffs with a radical of the formula (XVIII) are then reacted with the reactive component of the formula (XVI) and a compound $R_2$—H in any desired sequence.

The reactive dyestuffs can, of course, also be obtained by a process in which dyestuffs of the formula (XX)

(XX)

in which m, n, p, q, r, s, A, W and $R_1$ have the abovementioned meaning,
are reacted with 1 or 2 mols of the reactive component of the formula (XVI) and $R_2$—H (XVIa).

Products of the formula (XX) are obtained, for example, when a compound of the formula (XIV) in which $Y_5$ represents a nitro group is diazotised, the diazotisation product is coupled with a compound of the formula (XV) in which $Y_6$ represents an acyl group and the coupling product is triazotised. After reduction of the nitro group, the product is again diazotised, the diazotisation product is coupled with a component

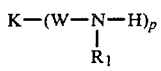 (XXI)

in which K, W, $R_1$ and p have the abovementioned meaning,
and the acyl group $Y_6$ is then split off by hydrolysis.

Dyestuffs of the general formula (IV) are also obtained by a process in which compounds of the formula (XIV) are diazotised, the diazotisation products are coupled with coupling components H—$K_1$ and the nitro group is then reduced or the acylamino group is then saponified. After diazotising the aminoazo compound thus obtained, of the formula

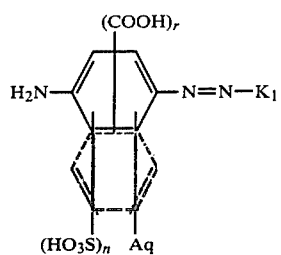 (XXII)

in which n, r, q, A and $K_1$ have the meaning indicated above,
the diazotisation product is coupled with compounds of the formula (XV) or (XVa) and the coupling product is triazolated. After reduction of the nitro group or saponification of the acylamino group which may be necessary, the resulting dyestuffs are treated with the reactive component of the formula (XVI) and the compound $R_2$—H (XVIa) in any desired sequence.

Dyestuffs of the formula (XIII) in which $Y_4$ denotes an alkoxy group are obtained by a process in which compounds of the formula (XIV) in which $Y_5$ represents a nitro group are diazotised, the diazotisation products are coupled with compounds of the formula (XV) in which $Y_6$ denotes an acyl group and the coupling products are triazolated. After reduction of the nitro group, the products are diazotised again, the diazotisation products are coupled with phenol and the phenol derivative and the hydroxyl group is alkylated in the customary manner. The acryl group $Y_6$ is then split off by hydrolysis and the dyestuff is reacted with the reactive component of the formula (XVI) and the compound $R_2$—H (XVIa) in any desired sequence.

Dyestuffs of the formula (XIII) in which $Y_4$=alkoxy are likewise obtained when aminoazo compounds of the formula

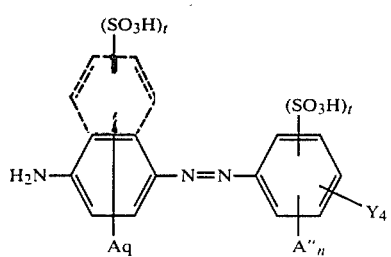 (XXIII)

in which q, t, n, A and A" have the meaning indicated above and
$Y_4$ denotes an alkoxy group which is optionally substituted by halogen, hydroxyl, alkoxy or cyano radicals, are diazotised, the diazotisation products are coupled with compounds of the formula (XV) or (XVa) and the coupling products are triazolated. The dyestuff is then reacted with the reactive comonent, if appropriate after splitting off the acyl group or reducing the nitro group. Aminoazo compounds of the formula (XXIII) are obtained in the customary manner by diazotisation and coupling, using compounds of the formula

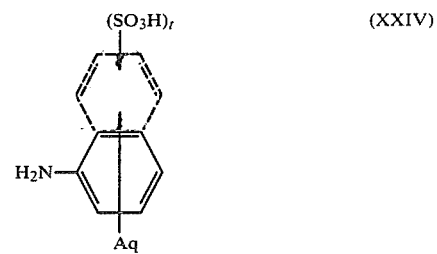 (XXIV)

and

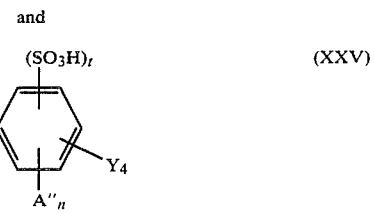 (XXV)

in which q, t, n, A, A" and $Y_4$ have the meaning indicated in formula (XXIII).

If appropriate, the N-methanesulphonic acid of the aniline of the formula (XXIV) is employed and, when the coupling reaction has ended, the protective group is hydrolysed.

The following compounds may be mentioned as examples of starting materials for the preparation of the new dyestuffs:

(a) Amino compounds of the formula (XIV): 4-nitro-aniline, 2-chloro- and 3-chloro-4-nitro-aniline, 2,5-dichloro- and 2,6-dichloro-4-nitro-aniline, 4-nitro-2-methyl-aniline, 5-chloro-4-nitro-2-methyl-aniline, 2-cyano-4-nitro-aniline, 4-amino-acetanilide, 4-amino-oxanilic acid, 2,5-dichloro-4-amino-acetanilide, 2-amino-5-acetylamino-toluene, 4-nitro-aniline-2- and -3-sulphonic acid, 5-amino-2-oxalylamino-benzenesulphonic acid, 2-amino-5-formylamino-benzenesulphonic acid, 2-amino-5-acetylamino-benzenesulphonic acid, 5-nitro-2-amino-benzenecarboxylic acid, 2-amino-5-acetylamino-benzene-1- and -2-carboxylic acid, 4-nitro-naphthyl-1-amine-5-sulphonic acid, 4-nitro-naphthyl-1-amine-6-sulphonic acid and 1-amino-4-acetylamino-naphthalene-6- and -7-sulphonic acid, (b) Amino compounds of the formula (XV) and (XVa): 1,3-diamino-benzene, 4-chloro-1,3-diamino-benzene, 2,4-diaminotoluene, 2,6-diamino-toluene, 1,4-diamino-naphthalene, 2,7-diamino-naphthalene, 2,4-diamino-benzenesulphonic acid, 1,5-diamino-naphthalene-3,7-disulphonic acid, 1,6-diamino-naphthalene-4,8-disulphonic acid, 1,4-diamino-naphthalene-6-sulphonic acid, 1-amino-4-acetaminonaphthalene-6-sulphonic acid, 1-amino-4-acetamino-naphthalene-7- sulphonic acid, 1-amino-6(4-nitrobenzoylamino)-naphthalene-4,8-disulphonic acid, 1-amino-4-(3-nitrobenzoylamino)-naphthalene-7-sulphonic acid and 1-amino-4-(4-nitrobenzoylamino)-naphthalene-6-sulphonic acid.

(c) Coupling components K-H: 3-methyl-pyrazol-5-one, 1-phenyl-3-methyl-pyrazol-5-one, 1-(2-chlorophenyl)-3-methyl-pyrazol-5-one, 1-(2,5-dichlorophenyl)-3-methyl-pyrazol-5-one, 1-phenyl-3-methyl-pyrazol-5-one-3-carboxylic acid and -carboxylic acid ethyl ester, 1-phenyl-3-methyl-pyrazol-5-one-imide, 1-(2-chlorophenyl)-3-methy-lpyrazol-5-one-imide, 1,0-tolyl-3-methyl-pyrazol-5-one-imide, 1-(2-, 3- or 4-sulphophenyl)-3-methyl-pyrazol-5-one, 1-(6-chloro-3-sulphophenyl)-3-methyl-pyrazol-5-one, 1-(2,5-dichloro-4-sulphophenyl)-3-methyl-pyrazol-5-one, 1-(4-sulpho-2-methylphenyl)-3-methyl-pyrazol-5-one, 1-(6-chloro-4-sulpho-2-methylphenyl)-3-methyl-pyrazol-5-one, 1-(4-sulphophenyl)-3-methyl-pyrazol-5-one-imide, 1-(8-sulpho-naphth-2-yl)-3-methyl-pyrazol-5-one-imide, 1-[6-sulpho-naphth-2-yl]-3-methyl-pyrazol-5-one, 1-(4-sulphophenyl)-pyrazol-5-one-3-carboxylic acid, 1-(6-chloro-4-sulpho-2-methylphenyl)-pyrazol-5-one-3-carboxylic acid ethyl ester, 1-(4-aminophenyl)-3-methyl-pyrazol-5-one, 1-(3-aminophenyl)-3-methyl-pyrazol-5-one, 1-(3-amino-5-sulpho-2-methylphenyl)-3-methyl-pyrazol-5-one, 1-(4-aminophenyl)-pyrazol-5-one-3-carboxylic acid, 1-(3-aminophenyl)-pyrazol-5-one-3-carboxylic acid, 1-[3-(3-nitrobenzoyl-amino)-phenyl]-pyrazol-5-one-3-carboxylic acid, 1-carboxymethyl-3-methyl-pyrazol-5-one, 1-(2-cyanoethyl)-3-methyl-pyrazol-5-one, 1-(2-chloroethyl)-3-methyl-pyrazol-5-one, 1-methyl-, ethyl- or -propyl-3-methyl-pyrazol-5-one, 1-methyl-2-hydroxy-4-methyl-5-cyano-pyrid-6-one, 1-phenyl-2-hydroxy-4-methyl-5-cyano-pyrid-6-one, 2,4,6-trihydroxy-pyrimidine, 2-methyl-4,6-dihydroxy-pyrimidine, 2-phenyl-4-amino-6-hydroxy-pyrimidine, 2-phenyl-4,6-dihydroxy-pyrimidine, acetoacetic anilide, o-, m- and p-anisidide and o-, m- and p-toluidide, acetoacetic acid p-chloroanilide, acetoacetic acid 4-chloro-2-methylanilide, acetoacetic acid 2,4- or 2,5- or 2,6-dimethylanilide, acetoacetic acid 4-sulpho-anilide, acetoacetic acid 2-methoxy-4-sulpho-5-methyl-anilide, acetoacetic acid 2,4-, 2,5- or 3,5-disulpho-anilide, acetoacetic acid 2,5-disulpho-4-acetylamino-anilide, acetoacetic acid 2- or 3-sulpho-4-ethoxy-anilide or acetoacetic acid 3-sulpho-4-methyl-anilide; naphth-1-ol-3-, -4- and -5-sulphonic acid, naphth-2-ol-4-, -5-, -6- and -7-sulphonic acid, 6-amino-naphth-1-ol-3-sulphonic acid, 6-acetylamino-naphth-1-ol-3-sulphonic acid, 6-benzoylamino-naphth-1-ol-3-sulphonic acid, 7-amino-naphth-1-ol-3-sulphonic acid, 7-dimethylamino-naphth-1-ol-3-sulphonic acid, 7-anilino-naphth-1-ol-3-sulphonic acid, 7-acetylamino-naphth-1-ol-3-sulphonic acid, 7-benzoylamino-naphth-1-ol-3-sulphonic acid, 8-acetylamino-naphth-1-ol-5-sulphonic acid, 8-acetylamino-naphth-2-ol-5- or -6-sulphonic acid, 6-(4-amino-benzoylamino)-naphth-1-ol-3-sulphonic acid, 7-(2-aminoethyl-amino)-naphth-1-ol-3-sulphonic acid, 8-acetylamino- and benzoylamino-naphth-1-ol-3,5-disulphonic acid, 7-acetylamino-naphth-1-ol-3,6-disulphonic acid, 8-amino-, -acetylamino-, -benzoylamino-, benzenesulphonylamino-naphth-1-ol-3,6-disulphonic acid, naphth-1-ol-3,6-, -3,7-, -3,8-, -4,8- and -5,7-disulphonic acid, naphth-2-ol-3,6-, -3,7-, -4,8-, -5,7- and -6,8-disulphonic acid, naphthyl-1-amine-2- to -8-sulphonic acid, naphthyl-2-amine-1- and -5- to -8-sulphonic acid, naphthyl-1-amine-5,7-, -4,8-, -3,8-, -4,6-, -3,7- and -3,6-disulphonic acid, naphthyl-2-amine-5,7-, -4,7-, -3,7- and -3,6-disulphonic acid, 1-amino-naphthalene, 1- and 2-hydroxy-naphthalene, 8-acetamino-2-hydroxy-naphthalene, 8-methanesulphonylamino-2-hydroxy-naphthalene, 1-hydroxy-naphthalene-4-sulphonamide, 2-hydroxy-3-naphthoic acid, -naphthoic acid amide, -naphthoic acid anilide, -naphthoic acid chloroanilide and -naphthoic acid toluidide; phenol, 2-, 3-, and 4-methyl-phenol, 1-hydroxybenzene-2-carboxylic acid ethyl ester, 2-, 3- or 4-chlorophenol, 2-methyl-3-, -5- or -6-chlorophenol, 3-methyl-6-chlorophenol, 2-ethylphenol, 2,3- or 2,5- or 2,6- or 3,5-dichlorophenol, 2,6-diethylphenol, 2-cyclohexyl-phenol, 2-methoxy-phenol or ethoxy-phenol, 3-methoxy-phenol, 3-acetylaminophenol, 4-hydroxy-diphenyl, 4-cyclohexyl-phenol, 4-t-butyl-phenol, aniline, 2- or 3-methyl-aniline, 2,3-, 2,5- or 2,6-dimethyl-aniline, N-methyl- or N,N-dimethyl-aniline, N-ethyl, or N,N-diethylaniline, N,N-dipropyl-aniline, N-(2-chloroethyl)-N-butylaniline, N-methyl-N-(2-hydroxyethyl)-aniline, N,N-bis(2-hydroxyethyl)-aniline, N-methyl-N-(2-cyanoethyl)-aniline, N,N-diethyl-2- or -3-methyl-aniline, N,N-(bis-2-hydroxyethyl)-3-methylaniline, N,N-diethyl-3-acetamino-aniline, N,N-(bis-2-hydroxyethyl)-3-acetamino-aniline, N,N-diethyl-3-ethoxy-aniline, N,N-(bis-2-hydroxyethyl)-2-methoxy-5-methyl-aniline, N,N-(bis-2-acetoxyethyl)-3-acetamino-aniline and phenol-2- and -3-sulphonic acid.

(d) Amino compounds of the forula (XXV): 4-amino-anisole-2-sulphonic acid, 4-amino-phenetole-2-sulphonic acid, 4-amino-anisole-3-sulphonic acid, 4-amino-phenetole-3-sulphonic acid, 2-amino-anisole-4-sulphonic acid, 2-amino-anisole-4-sulphonic acid amide, 2-amino-1-methoxy-benzene-2-amino-1-ethoxy-benzene, 4-chloro-2-amino-anisole, 5-chloro-4-amino-anisole, 4,5-dichloro-2-amino-anisole, 3-amino-1-methoxy-benzene, 4-amino-1-methoxy-benzene, 4-amino-1-ethoxy-benzene and 2-chloro-4-amino-anisole.

(e) Amino compounds of the formula (XXIV): aniline, 2- and 3-methyl-aniline, 2- and 3-ethylaniline, 2,3-, 2,5- and 2,6-dimethyl-aniline, 2- and 3-methoxy-aniline, 2- and 3-ethoxy-aniline, 2-amino-4-methoxy-toluene, 3-amino-4-methoxy-toluene, 3-amino-4-ethoxy-toluene, 2,5-dimethoxy-aniline, 3-acetamino-aniline, 1-amino-naphthalene-6- and -7-sulphonic acid and 1-amino-2-ethoxy-naphthalene-6- and -7-sulphonic acid.

Suitable alkylating agents for etherifying the phenolic OH groups in the new dyestuffs are: alkyl halides, alkyl sulphonates, halogenohydrins, alkylene cyanides and alkylene oxides.

Specific examples which may be mentioned are: ethyl chloride, ethyl bromide, methyl iodide, dimethyl or diethyl sulphate, benzyl chloride, ethylene oxide, propylene oxide, acrylonitrile, 2-chloroethanol and 3-chloro-propan-1-ol.

Suitable acylating agents for the free amino group are acid halides and acid anhydrides, such as acetic anhydride, acetyl chloride, propionyl chloride and benzoyl chloride.

(f) Suitable compounds $R_2$-H of the formula (XVIa): ammonia, methylamine, ethylamine, n-propanolamine, iso-propanolamine, n-butylamine, iso-butylamine, tert.-butylamine, n-pentylamine, n-hexylamine, cyclohexylamine, dimethylamine, diethylamine, di-n-propylamine, di-iso-propylamine, methylethylamine, ethanolamine, diethanolamine, 2-methoxyethylamine, 2-ethoxyethylamine, sulphatoethylamine, aminoacetic acid, N-methylaminoacetic acid, taurine, N-methyltaurine, methylaminomethanesulphonic acid, pyrrolidine, piperidine, 1-methylpiperazine, morpholine, benzylamine, β-phenylethylamine, N-methylbenzylamine, dibenzylamine, aniline, 1-amino-2-, 3- or 4-methylbenzene, 1-amino-3,4- or 3,5-dimethylbenzene, 1-amino-2-, 3- or 4-ethylbenzene, 1-amino-2-, 3- or 4-methoxybenzene, 1-amino-4-ethoxybenzene, 1-amino-2-, 3- or 4-(2-hydroxyethoxy)-benzene, 1-amino-2-, 3- or 4-(2-methoxyethoxy)-benzene, 1-amino-2-, 3- or 4-chlorobenzene, 2-, 3- or 4-aminophenylmethanesulphonic acid, 2-aminobenzenesulphonic acid, 3-aminobenzenesulphonic acid, 4-aminobenzenesulphonic acid, 5-aminobenzene-1,3- or 1,4-disulphonic acid, 4-aminobenzene-1,2- or 1,3-disulphonic acid, 2-, 3- or 4-aminobenzenesulphonamide, 2-, 3- or 4-aminobenzenesulphonic acid methylamide, 2-, 3- or 4-aminobenzenesulphonic acid dimethylamide, 2-, 3- or 4-aminobenzenesulphonic acid-(2-hydroxyethyl)-amide, 5-aminobenzene-1,3-dicarboxylic acid, 2-, 3- or 4-aminobenzoic acid, 2-, 3- or 4-aminobenzamide, 2-, 3- or 4-aminobenzoic acid methyl ester or ethyl ester, 2-, 3- or 4-aminobenzonitrile, 3-amino-(N-phenylsulphonyl)-benzenesulphonamide, 2-, 3- or 4-aminophenol, 5-amino-2-hydroxybenzenesulphonic acid, 4-amino-2-hydroxybenzenesulphonic acid, 5-amino-2-ethoxybenzenesulphonic acid, 1-acetylamino-2- or 4-aminobenzene, 1-amino-3- or 4-(hydroxyacetyl)-aminobenzene, 1-amino-4-(sulphoacetyl)-aminobenzene, 3- or 4-aminophenylurea, N-(3-aminophenyl)-N'-(2-hydroxyethyl)-urea, 3- or 4-aminophenyloximic acid, 1-methylamino-3- or 4-methylbenzene, 1-ethylamino-4-chlorobenzene, 3-amino-4-methoxy-benzenesulphonic acid, 1-ethylamino-3- or 4-methylbenzene, N-(2-hydroxyethyl)-aniline, 1-(2-hydroxyethyl)-amino-3-methylbenzene, 3- or 4-methylaminobenzoic acid, 4-methylaminobenzenesulphonic acid, 5-amino-2-oxalamino-benzenesulphonic acid, 2-aminonaphthalene-1-sulphonic acid, 4-aminonaphthalene-1-sulphonic acid, 5-aminonaphthalene-1-sulphonic acid, 6-aminonaphthalene-1-sulphonic acid, 7-aminonaphthalene-1-sulphonic acid, 8-aminonaphthalene-1-sulphonic acid, 1-aminonaphthalene-2-sulphonic acid, 4-aminonaphthalene-2-sulphonic acid, 5-aminonaphthalene-2-sulphonic acid, 6-aminonaphthalene-2-sulphonic acid, 7-aminonaphthalene-2-sulphonic acid, 7-methylaminophthalene-2-sulphonic acid, 7-butylaminonaphthalene-2-sulphonic acid, 7-isobutylaminonaphthalene-2-sulphonic acid, 8-aminonaphthalene-2-sulphonic acid, 4-aminonaphthalene-1,3-disulphonic acid, 5-aminonaphthalene-1,3-disulphonic acid, 6-aminonaphthalene-1,3-disulphonic acid, 7-aminonaphthalene-1,3-disulphonic acid, 8-aminonaphthalene-1,3-disulphonic acid, 2-aminonaphthalene-1,5-disulphonic acid, 3-aminonaphthalene-1,5-disulphonic acid, 4-aminonaphthalene-1,5-disulphonic acid, 4-aminonaphthalene-1,6-disulphonic acid, 8-aminonaphthalene-1,6-disulphonic acid, 4-aminonaphthalene-1,7-disulphonic acid, 3-aminonaphthalene-2,6-disulphonic acid, 4-aminonaphthalene-2,6-disulphonic acid, 3-aminonaphthalene-2,7-disulphonic acid, 4-aminonaphthalene-2,7-disulphonic acid, 6-aminonaphthalene-1,3,5-trisulphonic acid, 7-aminonaphthalene-1,3,5-trisulphonic acid, 8-aminonaphthalene-1,3,5-trisulphonic acid, 4-aminonaphthalene-1,3,6-trisulphonic acid, 7-aminonaphthalene-1,3,6-trisulphonic acid, 8-aminonaphthalene-1,3,6-trisulphonic acid and 4-aminonaphthalene-1,3,7-trisulphonic acid.

The new dyestuffs are particularly suitable for dyeing and printing natural and regenerated cellulose fibre materials, such as cotton and viscose staple, and natural and synthetic polyamide fibre materials, for example those of wool, silk, poly-ε-caprolactam or the polycondensate of hexamethylenediamine and adipic acid. The dyeings obtained, in particular those on cotton and viscose staple, are distinguished by good fastness properties, in particular fastness to wet processing and light.

EXAMPLE 1

6.9 g of sodium nitrite are added to 26.0 g (0.1 mol) of 1-amino-4-oxalylamino-benzenesulphonic acid in aqueous solution at pH 7 and the amine is diazotised indirectly in the customary manner by allowing the solution to run into 28 ml of hydrochloric acid (28% strength). The finished diazotisation solution is added to an aqueous suspension of 33.3 g (0.105 mol) of 1,6-diaminonaphthalene-4,8-disulphonic acid and the mixture is buffered to pH 4 with 20% strength sodium acetate solution. When the reaction has ended, the mixture is neutralised with sodium hydroxide solution, 90 ml of concentrated ammonia are added and the mixture is heated to 80°–90° C. For the triazolisation reaction, 56 g (0.22 mol) of copper sulphate are then sprinkled in and the temperature is maintained until the solution is decolorised. To split off the oxalyl radical and to precipitate copper oxide, sodium hydroxide (4% of the total volume) is added and the mixture is boiled for a further two hours. The precipitate is then filtered off and the filtrate is rendered acid to Congo Red, whereupon the triazole of the formula (I) precipitates. (Yield: about 0.08 mol; 80%)

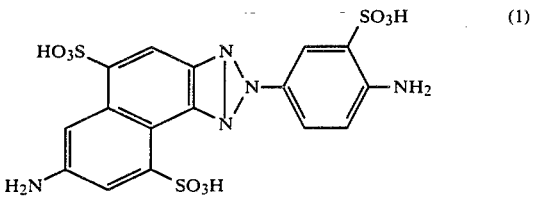

The product is dissolved, at pH 6.5, in 1 liter of water, the solution is cooled to 0° C. and 7.2 ml of cyanuric fluoride are slowly added dropwise. At the same time, the pH is kept constant with bicarbonate solution. The reaction has ended after a few minutes. 8.4 g of diethanolamine are added. The mixture is allowed to warm to room temperature and a pH value of 7.5–8 is maintained for 3–6 hours with sodium carbonate solution. When the second condensation reaction has ended, 6 g of sodium nitrite are added and 30 ml of hydrochloric acid (28% strength) are allowed to run in. After a subsequent reaction time of one hour, any excess nitrous acid is destroyed with amidosulphonic acid, 17.6 g (0.086 mol) of 1-phenyl-3-carboxy-pyrazol-5-one are sprinkled in and the mixture is buffered at pH 5 with sodium acetate. When the reaction has ended, the product is filtered off and dried at 40° C. in vacuo. The resulting dyestuff has, as the free acid, the formula:

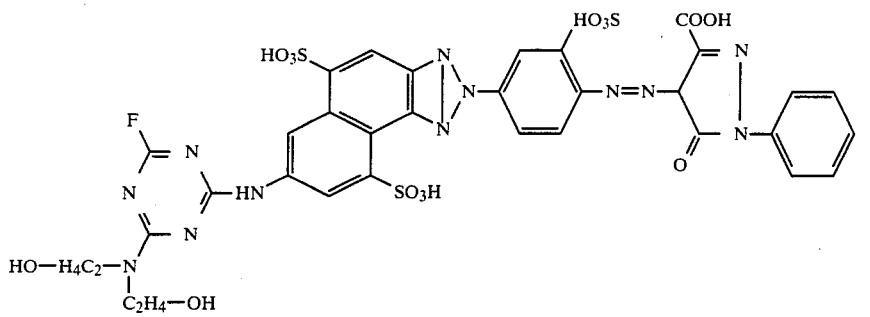

It is an orange-coloured powder which dissolves in water giving a yellow-coloured solution and dyes cotton in golden yellow shades.

EXAMPLE 2

31 g of 2-naphthylamine-4,6,8-trisulphonic acid are dissolved, at pH 4, in 150 ml of water, the solution is cooled to 0° C. and 7.2 ml of cyanuric fluoride are added. At the same time, a pH of 3–3.5 is maintained with bicarbonate. The reaction ends rapidly. The same amount of the triazole of the formula (1) described in Example 1, dissolved in 1 liter of water at pH 6 and at room temperature, is added to the reaction mixture. The reaction mixture is allowed to warm to room temperature and a pH value of 6.5–7 is maintained for 2–4 hours. When the condensation reaction has ended, 6 g of sodium nitrite and 30 ml of hydrochloric acid (28% strength) are added.

After about 1 hour, excess nitrous acid is destroyed with amidosulphonic acid, 15.0 g (0.086 mol) of 1-phenyl-3-methyl-pyrazol-5-one are sprinkled in and the mixture is buffered at pH 5 with sodium acetate. When the reaction has ended, the product is filtered off and dried at 40° C. in vacuo.

The resulting dyestuff has, as the free acid, the formula:

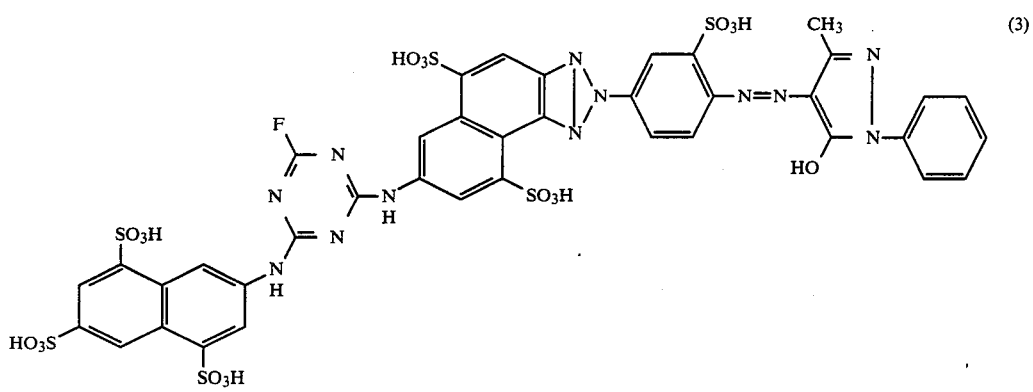

It is an orange-coloured powder which dissolves in water giving a yellow-coloured solution and dyes cotton in golden yellow shades.

The dyestuffs listed in the following Table I are obtained analogously to Examples 1 and 2 if cyanuric fluoride is treated with the compound of the formula 1 and a compound of $R_2$—H in the sequence mentioned, the product is then diazotised and the diazotisation product is reacted with a coupling component.

The dyestuffs dye cotton in the colour shades indicated.

TABLE I

| Diazo component | $R_2$—H | Analogously to Example | Coupling component | Colour shade on cotton |
|---|---|---|---|---|
| (structure shown) | Aminoacetic acid | 1 | 1-Phenyl-pyrazol-5-one-3-carboxylic acid ethyl ester | yellow |

TABLE I-continued

| Diazo component | R₂—H | Analogously to Example | Coupling component | Colour shade on cotton |
|---|---|---|---|---|
| " | Taurine | 1 | 1-(2-Chlorophenyl)-3-methyl-pyrazol-5-one | yellow |
| " | N—Methyltaurine | 1 | 1-(2,5-Dichlorophenyl-3-methyl-pyrazol-5-one | yellow |
| " | Methylamine | 1 | 1-(2-Methylphenyl)-3-methyl-pyrazol-5-one | yellow |
| " | Methylaminomethane-sulphonic acid | 1 | 1,3-Dimethyl-pyrazol-5-one | yellow |
| " | Aniline | 1 | 1-Carboxymethyl-3-methyl-pyrazol-5-one | yellow |
| " | Diethylamine | 1 | 1-(2-Carboxyethyl)-3-methyl-pyrazol-5-one | yellow |
| " | Ammonia | 1 | 1-(2-Carboxyethyl)-3-carboxy-pyrazol-5-one | yellow |
| " | Dimethylamine | 1 | 1-(4-Sulphophenyl)-3-methyl-pyrazol-5-one | yellow |
| " | Morpholine | 1 | 1-(2-Methyl-4-sulphophenyl)-3-methyl-pyrazol-5-one | yellow |
| " | Ammonia | 1 | 1-(4-Sulphophenyl)-pyrazol-5-one-3-carboxylic acid | yellow |
| " | 3-Aminobenzene-sulphonic acid | 2 | 1-(2,5-Dichloro-4-sulphophenyl)-3-methyl-pyrazol-5-one | yellow |
| " | 4-Aminobenzene-sulphonic acid | 2 | 1-(2-Sulphophenyl)-3-methyl-pyrazol-5-one | yellow |
| " | 1-Aminobenzene-2,5-disulphonic acid | 2 | 1-(6-Chloro-3-sulphophenyl)-3-methyl-pyrazol-5-one | yellow |
| " | 1-Aminobenzene-3,5-disulphonic acid | 2 | 1-(2-Chloro-4-sulphophenyl)-3-methyl-pyrazol-5-one | yellow |
| " | 2-Naphthylamine-4,8-disulphonic acid | 2 | 1-(6-Chloro-4-sulpho-2-methyl-phenyl)-3-methyl-pyrazol-5-one | yellow |
| " | Ethylamine | 1 | 1-(6-Sulpho-naphth-2-yl)-3-methyl-pyrazol-5-one | yellow |
| " | Diethanolamine | 1 | 1-Phenyl-3-methyl-5-aminopyrazole | yellow |
| " | Ethanolamine | 1 | 1-(3-Sulphophenyl)-3-methyl-5-amino-pyrazole | yellow |
| " | N—(2-Hydroxyethyl)-aniline | 1 | Barbituric acid | yellow |
| " | N—(2-Hydroxyethyl)-aniline | 1 | 1-(3-Carboxyphenyl)-3-methyl-pyrazol-5-one | yellow |
| " | N—(2-Hydroxyethyl)-aniline | 1 | 1,4-Dimethyl-2-hydroxy-5-cyano-pyrid-6-one | yellow |
| " | 2-Aminobenzoic acid | 2 | 1-Phenyl-2-hydroxy-4-methyl-5-cyano-pyrid-6-one | yellow |
| " | 2-Aminobenzene-sulphonic acid | 2 | 2-Hydroxy-pyrid-6-one | yellow |
| " | 4-Aminobenzoic acid | 2 | 2-Hydroxy-4-carboxy-pyrid-6-one | yellow |
| " | 4-Aminophenyl-methanesulphonic acid | 2 | 1-Methyl-2,4-dihydroxy-pyrid-6-one-5-carboxylic acid methylamide | yellow |
| " | N—(2-Hydroxyethyl)-aniline | 1 | 4-Acetoacetylamino-3-methoxy-6-methyl-benzenesulphonic acid | yellow |
| " | Ethanolamine | 1 | 4-Acetoacetylamino-3-methyl-6-methoxy-benzenesulphonic acid | yellow |
| " | Diethanolamine | 1 | 3-Acetoacetylamino-4-methoxy-benzenesulphonic acid | yellow |
| " | Sulphatoethyl-amine | 1 | 1-Acetoacetylamino-2-methoxy-benzene | yellow |
| " | 2-Methoxyethyl-amine | 1 | 1-Acetoacetylamino-2-chlorobenzene | yellow |
| " | N—Methylbenzyl amine | | 1-Acetoacetylamino-2-methylbenzene | yellow |
| " | Ammonia | 1 | 2-Hydroxy-naphthalene-6,8-disulphonic acid | scarlet |
| " | Aniline | 1 | 2-Hydroxy-naphthalene-3,6-disulphonic acid | scarlet |
| " | 3-Aminobenzoic acid | 2 | 1-Hydroxy-naphthalene-4-sulphonic acid | red |
| " | Cyclohexylamine | 1 | 8-Benzoylamino-naphth-1-ol-3,6-disulphonic acid | red |
| " | 2-Naphthylamine-6-sulphonic acid | 2 | 8-Acetylamino-naphth-1-ol-3,5-disulphonic acid | red |
| " | 2-Methylaniline | 1 | Naphthyl-1-amine-4,8-disulphonic acid | red |

TABLE I-continued

| Diazo component | R₂—H | Analogously to Example | Coupling component | Colour shade on cotton |
|---|---|---|---|---|
| " | 4-Aminobenzoic acid | 2 | Naphthyl-1-amine-4-sulphonic acid | red |
| " | 4-Aminophenol | 1 | Naphthyl-2-amine-3,6-disulphonic acid | scarlet |
| " | 1-Aminobenzene-2,5-disulphonic acid | 2 | (Cu-complex structure shown) | brown |
| " | Ethanolamine | 1 | (triazine structure shown) | yellow |
| " | Diethanolamine | 1 | (triazine structure shown) | yellow |

If the combinations of R₂—H and coupling component indicated in Table I are interchanged in any way, similarly valuable dyestuffs which dye cotton in the shades indicated result.

If 4-nitroaniline is diazotised in the known manner instead of 1-amino-4-oxalylamino-benzenesulphonic acid and the procedure followed is as in Example 1, the triazole compound (4)

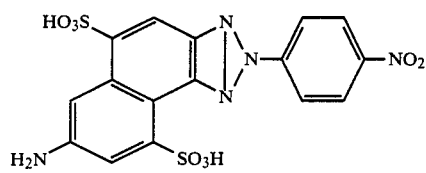

(4)

is obtained.

Reduction of the nitro group by the customary processes using iron or hydrogen/Raney nickel and subsequent reaction of the compound with 2,4,6-trifluoro-1,3,5-triazine and a compound R₂—H gives the diazo component (5)

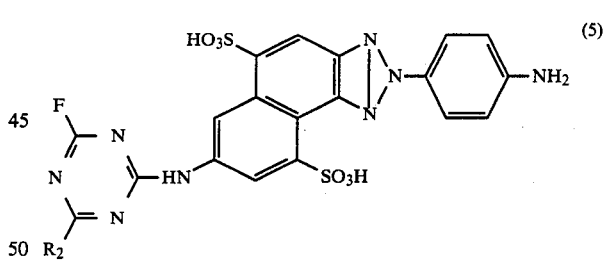

(5)

Diazotisation of this component and coupling of the diazotisation product are carried out analogously to Examples 1 and 2.

If the coupling components indicated in Table I and the compounds R₂—H mentioned therein are used, valuable dyestuffs which dye cotton in the shades indicated are obtained.

If 1-acetylamino-4-aminonaphthalene-6-sulphonic acid is diazotised in a known manner instead of 1-amino-4-oxalylamino-benzenesulphonic acid and the procedure followed is as in Example 1, the triazole compound (6)

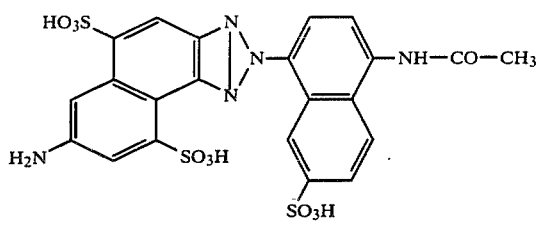

is obtained.

Saponification of the acetylamino groups and subsequent reaction with 2,4,6-trifluoro-1,3,5-triazine and a compound $R_2$—H gives the diazo component (7)

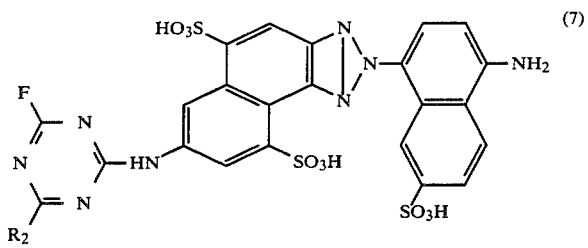

If 4-nitro-1-naphthylamine-6-sulphonic acid is diazotised in a known manner instead of 1-amino-4-oxalylamino-benzenesulphonic acid and the procedure followed is as in Example 1, the triazole compound (8)

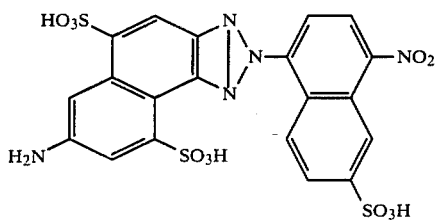

is obtained.

Reduction of the nitro group by customary processes and subsequent reaction with 2,4,6-trifluoro-1,3,5-triazine and a compound $R_2$—H gives the diazo component (9)

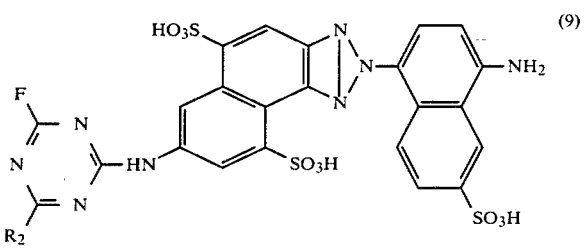

Diazotisation of the compounds (7) and (9) is carried out analogously to Examples 1 and 2.

If the coupling components mentioned in Table I and the compounds $R_2$—H indicated are used, new dyestuffs which dye cotton in more reddish-tinged shades than is indicated in Table I are obtained.

If the procedure followed is as in Example 1, but 2,6-diamino-toluene-4-sulphonic acid is employed as the coupling component, the triazole of the formula (10)

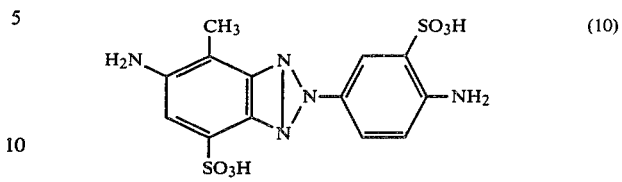

is obtained.

Subsequent reaction of the compound with 2,4,6-trifluoro-1,3,5-triazine and a compound $R_2$—H gives the diazo component (11)

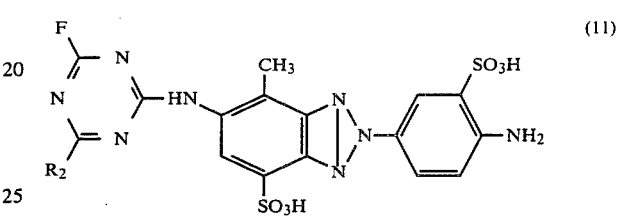

Diazotisation of this compound is carried out analogously to Examples 1 and 2.

If the coupling components indicated in Table I and the compounds $R_2$—H mentioned therein are used, valuable dyestuffs which dye cotton in the shades indicated are obtained.

EXAMPLE 3

20.3 g (0.1 mol) of 1-amino-4-methoxy-benzene-3-sulphonic acid are dissolved in 600 ml of ice-water under neutral conditions and 6.9 g of sodium nitrite are added. 28 ml of hydrochloric acid are poured in, the mixture is allowed to after-react for 15 minutes and any excess nitrous acid is then destroyed with amidosulphonic acid. The resulting suspension is added to a solution of 17.4 g of 3-amino-4-methoxy-toluene.HCl in 200 ml of water and the mixture is buffered at pH 3 with sodium acetate. When the coupling reaction has ended, the precipitate is isolated. It is dissolved in 800 ml of water at 40° under neutral conditions and, after adding 6.9 g of sodium nitrite, the solution is allowed to run into 28 ml of hydrochloric acid. After one hour, any excess nitrous acid is destroyed with amidosulphonic acid, 31.8 g of 1,6-diamino-naphthalene-4,8-disulphonic acid are sprinkled in and the mixture is buffered at pH 4 with sodium acetate. When the reaction has ended, the precipitate is filtered off and transferred to 900 ml of water and 90 ml of ammonia (concentrated). The mixture is warmed to 85°–90° and 56 g of copper sulphate are added. After about 4 hours, no further starting material can be detected. 30 g of sodium hydroxide are added, the mixture is boiled for one hour and copper oxides which have precipitated are filtered off.

The filtrate is then adjusted to pH 5 with hydrochloric acid and cooled to 0° C. and 7 ml of cyanuric fluoride are slowly added dropwise. At the same time, the pH is kept constant with bicarbonate solution.

When the reaction has ended, 11 g of (2-hydroxyethyl)-aniline are added. The mixture is allowed to warm to room temperature and a pH of 7–7.5 is maintained for 3–6 hours with sodium carbonate solution. When the condensation reaction has ended, the dyestuff is isolated with salt and dried at 40° C. in vacuo. It has, in the form of the free acid, the formula (10):

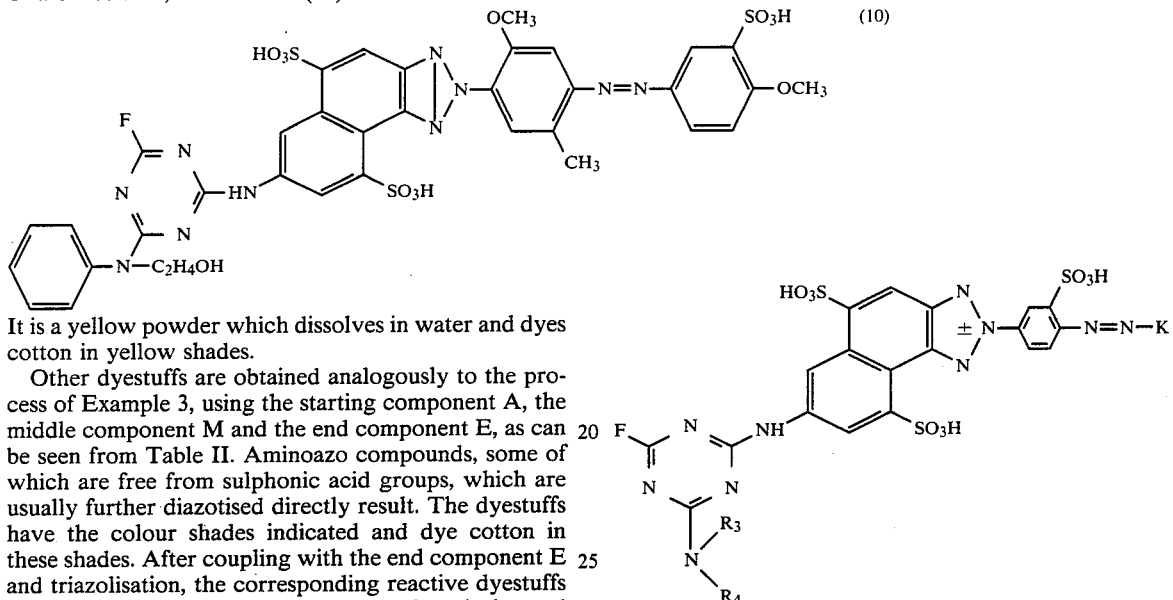

It is a yellow powder which dissolves in water and dyes cotton in yellow shades.

Other dyestuffs are obtained analogously to the process of Example 3, using the starting component A, the middle component M and the end component E, as can be seen from Table II. Aminoazo compounds, some of which are free from sulphonic acid groups, which are usually further diazotised directly result. The dyestuffs have the colour shades indicated and dye cotton in these shades. After coupling with the end component E and triazolisation, the corresponding reactive dyestuffs result on reaction with 2,4,6-trifluoro-1,3,5-triazine and compounds $R_2$—H from Table I.

TABLE II

| Starting component A | Middle component M | End component E | Colour shade |
|---|---|---|---|
| 1-Amino-4-methoxy-benzene-3-sulphonic acid | 1-Amino-3-methylbenzene | 1,6-Diamino-naphthalene-4,8-disulphonic acid | yellow |
| 1-Amino-4-ethoxy-benzene-3-sulphonic acid | 3-Amino-4-methoxytoluene | 1,6-Diamino-naphthalene-4,8-disulphonic acid | yellow |
| 1-Amino-4-methoxy-benzene-3-sulphonic acid | Amino-benzene | 1,6-Diamino-naphthalene-4,8-disulphonic acid | yellow |
| 1-Amino-4-methoxy-benzene-3-sulphonic acid | 1-Amino-2-methyl-benzene | 1,6-Diamino-naphthalene-4,8-disulphonic acid | yellow |
| 1-Amino-4-methoxy-benzene-3-sulphonic acid | Naphthyl-1-amine-6-sulphonic acid | 1,6-Diamino-naphthalene-4,8-disulphonic acid | yellow |
| 1-Amino-4-methoxy-benzene-3-sulphonic acid | 1-Amino-2-ethoxy-naphthalene-6-sulphonic acid | 1,6-Diamino-naphthalene-4,8-disulphonic acid | yellow |
| 1-Amino-4-methoxy-benzene-2-sulphonic acid | 1-Amino-2-methyl-benzene | 1,6-Diamino-naphthalene-4,8-disulphonic acid | yellow |
| 1-Amino-4-methoxy-benzene-2-sulphonic acid | Naphthyl-1-amine-7-sulphonic acid | 1,6-Diamino-naphthalene-4,8-disulphonic acid | yellow |
| 4-Methoxy-aniline | Naphthyl-1-amine-7-sulphonic acid | 1,6-Diamino-naphthalene-4,8-disulphonic acid | yellow |
| " | 3-Amino-4-methoxy-toluene | 1,6-Diamino-naphthalene-4,8-disulphonic acid | yellow |
| 4-Ethoxy-aniline | 3-Methyl-aniline | 1,6-Diamino-naphthalene-4,8-disulphonic acid | yellow |
| 1-Amino-4-methoxy-benzene-3-sulphonic acid | Naphthyl-1-amine-7-sulphonic acid | 1,6-Diamino-naphthalene-4,8-disulphonic acid | yellow |
| 1-Amino-4-methoxy-benzene-3-sulphonic acid | Naphthyl-1-amine-7-sulphonic acid | 4,8-Diamino-naphthalene-2,6-disulphonic acid | yellow |
| 1-Amino-4-methoxy-benzene-3-sulphonic acid | Naphthyl-1-amine-7-sulphonic acid | 1,3-diaminobenzene | yellow |

We claim:

1. A metal free azo dyestuff of the formula in which
K is the radical of a pyridone or pyrimidene coupling component, and
$R_3$ and $R_4$ each independently is hydrogen; $C_1$-$C_6$-alkyl; $C_1$-$C_6$-alkyl substituted by OH, $SO_3H$, COOH or $OSO_3H$; phenyl; naphthyl; or phenyl or naphthyl substituted by $SO_3H$ or COOH.

2. A dyestuff according to claim 1, in which

K is 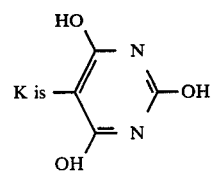

* * * * *